United States Patent
Reddy et al.

(10) Patent No.: US 12,306,687 B2
(45) Date of Patent: May 20, 2025

(54) APPARATUS AND METHOD FOR ACHIEVING DETERMINISTIC POWER SAVING STATE

(71) Applicant: Intel Corporation, Santa Clara, CA (US)

(72) Inventors: Nagabhushan Reddy, Bangalore (IN); Abhinay Gupta, Gwalior (IN); Vinithra Janarthanan, Bangalore (IN); Santhosh Raghuram Krishnaswamy, Bangalore (IN); Pannerkumar Rajagopal, Bangalore (IN); Siddharth Selvaraj, Coimbatore (IN); Mihir Shah, Folsom, CA (US); Vishwanath Somayaji, Haralur Bangalore (IN)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 17/484,335

(22) Filed: Sep. 24, 2021

(65) Prior Publication Data
US 2022/0011842 A1    Jan. 13, 2022

(51) Int. Cl.
*G06F 1/32* (2019.01)
*G06F 1/30* (2006.01)
(Continued)

(52) U.S. Cl.
CPC .............. *G06F 1/30* (2013.01); *G06F 1/3225* (2013.01); *G06F 11/076* (2013.01); *G06F 11/0772* (2013.01); *G06F 11/079* (2013.01)

(58) Field of Classification Search
CPC ........ G06F 1/30; G06F 1/3225; G06F 11/076; G06F 11/0772; G06F 11/079
See application file for complete search history.

(56) References Cited

U.S. PATENT DOCUMENTS

2009/0055671 A1* 2/2009 Kim ................. H04W 52/0225
                                                    713/323
2013/0290760 A1   10/2013 Cooper et al.
(Continued)

OTHER PUBLICATIONS

Extended European Search Report from European Patent Application No. 17/484,335 notified Feb. 16, 2023, 6 pgs.
(Continued)

*Primary Examiner* — Zahid Choudhury
(74) *Attorney, Agent, or Firm* — Essential Patents Group, LLP

(57) ABSTRACT

An apparatus comprises a first circuitry to perform, in response to a first message from an operating system, a first process to place a computer device in a first operating mode, store state information in a volatile memory of the computer device, and start a timer for a time-out period for performing the first process. First components of the computer device are in a low power state. A second circuitry to detect, after the time-out period, a failure of the first process. A third circuitry to perform, in response to the detected failure of the first process, a second process to place the computer device in a second operating mode and store state information in a non-volatile memory of the computer device. The volatile memory is operational in the first operating mode and is in a low power state in the second operating mode.

20 Claims, 5 Drawing Sheets

(51) Int. Cl.
  *G06F 1/3225*  (2019.01)
  *G06F 11/07*  (2006.01)

(56) References Cited

U.S. PATENT DOCUMENTS

2014/0006820 A1* 1/2014 McKenney ........... G06F 1/3287
                                                713/320
2015/0323983 A1* 11/2015 Hobson ................ G06F 1/3296
                                                713/323
2019/0258309 A1   8/2019 Grobelny et al.

OTHER PUBLICATIONS

Notice of Allowance from European Patent Application No. 22191310.6 notified Sep. 30, 2024, 8 pgs.

* cited by examiner

APPARATUS AND METHOD FOR ACHIEVING DETERMINISTIC POWER SAVING STATE

BACKGROUND

Energy efficiency is of increasing important in computer devices, such as desktop computers, laptops, tablets, servers, and smartphones. To conserve power, many computer devices may be placed in a range of power modes of operation. These power modes may include "on" and "off" power modes, and one or more intermediate power modes between the on and off modes. In the on mode, the computer device may be fully operational. In the off mode, the computer device may be fully powered down and not operational. In the intermediate power modes, sometimes referred to as "standby" or "sleep" modes, the computer device may reduce or cut power to components of the computer device or peripheral devices that are not currently needed. In addition, a clock frequency provided to a component or device may be reduced. A computer device operating in an intermediate power mode consumes less energy than in a fully-on power mode. In the intermediate power modes, while various functions of the computer device are disabled, other functions deemed critical or important may remain operable.

The Advanced Configuration and Power Interface (ACPI) is an open standard that specifies global and device power states, processor states, and performance states, e.g., ACPI Specification Version 6.3, released January 2019. ACPI allows the operating system (OS) of a computer device to manage power consumption. The Modern Standby (formally Connected Standby) standard by Microsoft® is an open standard specification used by Window® 8 and later Windows operating systems and platforms that implements ACPI. Computer devices implementing Modern Standby provide a user experience in which the device is always connected to a network and resumes from a Modern Standby session with low latency.

Instead of ACPI and Modern Standby, some computer devices, e.g., macOS computer devices, may use a different or proprietary specification for managing power consumption. Computer devices not following ACPI or Modern Standby may nonetheless place various hardware components of the system of in one or more intermediate power states between "on" and "off" power mode to manage power consumption.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
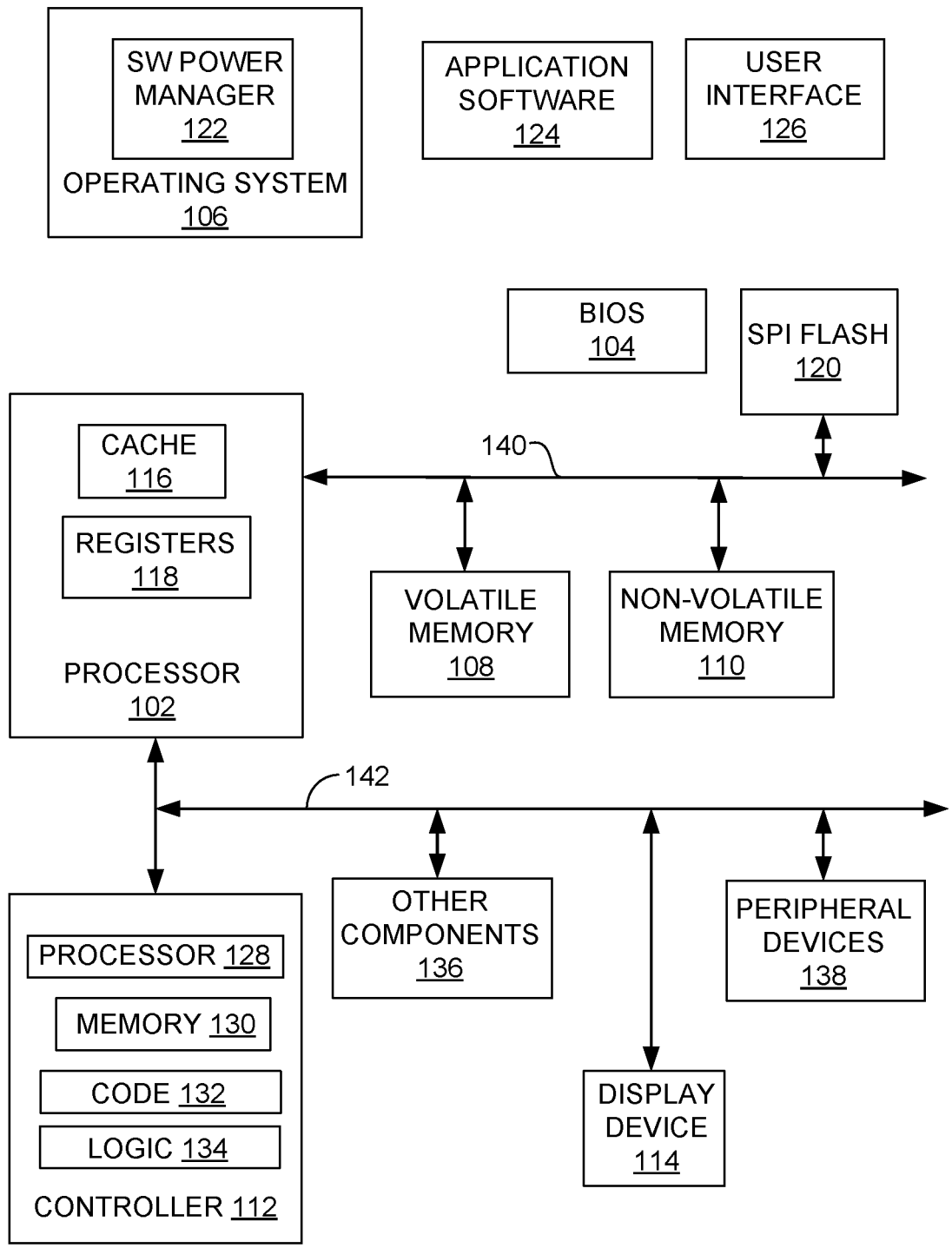
FIG. 1 illustrates some components of a computing system having a capability to achieve a low power state in a deterministic manner in accordance with some embodiments.

According to various embodiments, an operating system (OS) detects an "event" indicating a computer device may enter a power saving, first operating mode. The event may be, for example, an absence of user activity, the user pressing a physical button on the device, the user closing the lid of a laptop, the user selecting "Sleep" from displayed power button settings, or the system idling out. In response to detecting the event, the OS generates and sends a notification message to an embedded controller, e.g., a power management unit (PMU), of the computer device. The notification message indicates that the OS is entering a first operating mode, e.g., Modern Standby. In addition, the notification message includes an instruction to the embedded controller to perform a first process for placing first hardware components in the first operating mode and to start a timer for completing the first process.

In conjunction with the notification message to the embedded controller that the OS is entering a first operating mode, the OS begins to transition through a set of phases to prepare application and system software for entering a lowest power state, e.g., software deepest idle runtime platform state (DRIPS). Software DRIPs (SW DRIPs) refers to the OS's perception of when a processor, e.g., a System-on-a-Chip (SoC), can be placed into its lowest power state. It is based on device power state and CPU idle time. In contrast, hardware DRIPS (HW DRIPs) refers to the actual physical residency of the SoC (or other processor) in its lowest power state, as controlled by an SoC controller, e.g., PMU, or microcode.

On receipt of the notification from the OS, the embedded controller instructs various hardware components to enter a low power state associated with the first operating mode. The low power state for the first hardware components may be HW DRIPs. However, sometimes software or hardware may not enter respective SW DRIPs or HW DRIPs as intended. A non-exclusive list of reasons for this include: an incorrect device driver is installed, the installed driver is correct, but not working properly, or a hardware component is instructed to enter an idle state, but the component is nonetheless provided with a clock signal. It should be appreciated that SW DRIPs or HW DRIPs may not be achieved for other reasons. If SW DRIPs or HW DRIPs is not achieved, the computing device continues to consume power at a higher level than may be desirable. This wastes power and may cause the battery of a battery-powered computing device to be needlessly run down.

According to various embodiments, the OS and a power management unit monitor for SW DRIPs and HW DRIPs to be achieved. If the OS determines the SW DRIPs is not achieved, it sends a message to the power management unit. The power management unit includes a timer. If SW DRIPs or HW DRIPs is not achieved within a time-out period, the power management unit sends a message to the OS indicating a cause for the computer device not entering the low power state. The OS may determine an operation to remove the cause, i.e., fix the problem, and perform the operation one or more times. The power management unit counts the attempts. If the operation performed by the OS fixes the problem, the computer system enters the low power state. However, if the operation performed by the OS does not fix the problem within a specified number of attempts, the hardware power manager sends a message to the OS indicating that the computer device should enter a power saving, second operating mode. In response to receipt of this message, the OS sends a message to the power management unit instructing it to perform a second process for placing the computer system in the second operating mode. Performance of the second process generally results in both SW DRIPs and HW DRIPs being achieved.

In some embodiments, the first operational mode includes an Advanced Configuration and Power Interface Modern Standby state. In some embodiments, the second operational mode includes an Advanced Configuration and Power Interface Hibernate state. In some embodiments, the state information includes at least one of operating system state information, software state information, and processor state information.

There are many technical effects of various embodiments. For example, various embodiments determine that software or hardware has not entered a low power state, e.g., SW DRIPs or HW DRIPs, within a time-out period. In addition, according to various embodiments, a possible reason or cause for software or hardware not entering the low power state may be determined. In some embodiments, an operation to place a component in low power state is identified based on the determined cause for the component not entering low power state. In some embodiments, the identified operation is performed. Subsequent to the operation being performed, it may be determined whether the operation allowed the component to enter the low power state of the first operating mode. In various embodiments, if the component is still not in low power state after the operation, the operation may be repeated. The operation may be performed one or more times within a second time-out period. If the component enters low power state within the second time-out period, software and hardware advantageously enter low power states, e.g., SW DRIPs and HW DRIPs. If the component does not enter low power state after the second time-out period has expired, the computer device is placed in a second operating mode. The second operating mode places the component in a low power state of the second operating mode, e.g., a Hibernate state. In addition, the computer device as a whole may be placed in the second operating mode. Advantageously, the computer device consumes a low level of power in the Hibernate state. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Various embodiments are described with reference to the states and modes of operation of the ACPI and Modern Standby standards. It should be appreciated, however, that the present disclosure contemplates embodiments in which other states and modes of operation may be used in addition to or in the place of ACPI and Modern Standby states and modes of operation. Accordingly, any of the description herein associated with ACPI and Modern Standby may apply to the power states and modes of operation of other standards and specifications. Various embodiments of the present disclosure may be employed with any suitable power states and modes of operation.

Advanced Configuration and Power Interface (ACPI) is an open standard used by operating systems to manage power consumption in a computer system. ACPI specifies global states, sleep states, and power states for a computer system's components. ACPI specifies four global states: G0 (working), G1 (sleeping), G2 (soft off), and G3 (mechanical off). The specification defines six sleep states: S0, S0ix, S1, S2, S3, and S4. The specification provides for five power states for components: D0, D1, D2, D3hot, and D3cold.

The G0 (working) global state has one sleep state: S0 in which the computer's CPU executes instructions. In G1 (sleeping) global state, five sleep states are possible: S0ix, S1, S2, S3, and S4. The G2 (soft off) global state has one sleep state: S5. In G3 (mechanical off) global state, power to all components of the computer system except the clock is cut. G3 global state has no sleep states. In addition, ACPI specifies various power states for a computing system's device components.

S0ix is known as "Modern Standby" or "Low Power S0 Idle." Modern Standby comprises Screen Off and Sleep states. The Screen Off state includes processes to quiesce a computer system to sleep. In S0ix, the screen is turned off, application software stops executing, and parts of an SoC that are not in use are placed in a low or no power state. In Modern Standby, no OS software activity runs. Modern Standby allows the system to wake up very quickly when needed. Modern Standby starts, for example, when a user presses the power button, closes the lid, selects Sleep from a menu, or the system idles out. A hardware interrupt (e.g., wake event 228) causes the system to exit Modern Standby, e.g., user pressing the power button.

S1 is referred to as "Power on Suspend." In S1, the processor stops executing instructions and caches are flushed. In S1, power to the CPU and RAM is maintained, and power is cut to devices that do not indicate they must remain on. In S2, the CPU is powered off and a cache, if in a dirty state, is flushed to RAM. S3 state may be referred to as the "standby" or "sleep" state. In S3, power is maintained to RAM. In S4, all content of RAM is saved to a non-volatile memory and the computer system is powered down. S4 may be called "hibernation" or "suspend to disk." In sleep state S5, power is supplied to the computer's power-on button, but power is cut to all or almost all other components.

ACPI specifies various power states for a computing system's device components: D0 (fully on), D1 and D2 (intermediate power states, definition varies by device), D3hot (auxiliary power provided to device) and D3cold (no power provided). D3hot is a sub-state of D3 that a device can enter directly from D0. A device makes a transition from D0 to D3hot under software control by the device driver. In D3hot, the device can be detected on the bus that it connects to. The bus must remain in the D0 state while the device is in the D3hot sub-state. From D3hot, the device can either return to D0 or enter D3cold. D3cold can be entered only from D3hot. D3cold is a sub-state of D3 in which the device is physically connected to the bus but the presence of the device on the bus cannot be detected (e.g., until the device is turned on again). In D3cold, one or both of the following is true: (1) The bus that the device connects to is in a low-power state; (2) The device is in a low-power state in which the device does not respond when the bus driver tries to detect its presence on the bus. When a computer system enters G1 (sleeping) global state and S0ix (Modern Standby) sleep state, various devices and components of a computer system that are not in use may be placed in a low power state, e.g. D3 hot or cold.

FIG. 1 illustrates a computer system 100 having a capability to achieve a low power state in a deterministic manner in accordance with some embodiments. Computing system 100 comprises a processor 102, Basic Input/Output System (BIOS) 104, operating system (OS) 106, volatile memory 108, non-volatile memory 110, controller 112, and display device 114. Processor 102 comprises cache 116 and registers 118. Cache 116 may include multiple caches. Volatile memory 108 comprises random access memory (RAM). Non-volatile memory 110 comprises hard disk or flash memory, or both. BIOS 104 is firmware which runs on the Processor 102. BIOS 104 is typically stored in SPI flash memory 120. BIOS 104 is responsible for booting up computing system 100. During boot, BIOS 104 is copied to volatile memory 108 and runs from there.

OS 106 includes a software (SW) power manager 122. Application software 124 and a user interface 126 run under OS 106. OS 106, application software 124, and user interface 126 are typically stored in non-volatile memory 110. After boot up, part or all of the OS 106, application software 124, and user interface are copied to volatile memory 108 and run from there.

Controller 112 and processor 102 (and processor 404, and PCU 410 described below) comprise one or more instances of circuitry. As used herein, the term "circuitry" comprises various electronic and electrical devices ("hardware"). Examples of hardware include analog circuits and analog circuit components (e.g., resistors, capacitors, inductors, diodes, and transistors). Other examples of hardware include digital circuits and digital circuit components, such as logic devices implementing Boolean functions. Examples of digital circuits include programmable logic devices (PLD), field programmable gate arrays (FPGA), application specific integrated circuits (ASIC), processors, processor cores, microprocessors, microcontrollers, digital signal processors (DSP), and graphics processors. In yet another example, hardware includes a circuit that may be synthesized using a hardware description language (HDL) and which implements a state machine or other logic circuit. It should be understood that when hardware executes instructions stored in a memory device, the term hardware includes the stored instructions. Additional examples of hardware include volatile and non-volatile memory devices, such as registers, read-only memory (ROM), random access memory (RAM), and flash memory. Circuitry can include two or more instances of circuitry. Circuitry may comprise a combination of hardware elements that cooperate to provide one or more functions. A particular instance of circuitry may be referred to with a descriptive or non-descriptive label. For example, instances of circuitry that perform various functions may be referred to as receiver circuitry, processor circuitry, first circuitry, or second circuitry. Each of two or more instances of circuitry can be comprised of distinct components. In addition, two or more instances of circuitry can share one or more common components or resources.

Controller 112 comprises circuitry. In some embodiments, controller 112 may include a processor 128 and memory 130. Processor 128 may be a microcontroller or other suitable processing logic in various embodiments. Memory 130 may be any type of memory, e.g., RAM, ROM, Flash. Controller 112 may include code 132, e.g., instructions readable by processor 128. Controller 112 may also include logic 134, e.g., logic circuits for performing specific tasks. In some embodiments, controller 112 include all of processor 128, memory 130, code 132, and logic 134. In some embodiments, controller 112 may include some but not all of processor 128, memory 130, code 132, and logic 134.

Computer system 100 comprises other components 136, peripheral devices 138, and busses 140, 142. Computer system 100 comprises a number of components not shown in FIG. 1. These components are well known to one or ordinary skill in the art and omitted from the figure so as to not obscure the inventive concepts disclosed herein. These components are represented by other components 136. Other components 136 comprise bus controllers, memory controllers, video controllers, audio controllers, network interfaces, transmitter/receiver devices, and graphics processors. In some embodiments, other components 136 comprise parts of processor 102, e.g., cache 116. Other components 136 may comprise busses or communication channels other than busses 142. The foregoing is a non-exhaustive list of other components 136. Peripheral devices 138 comprise input and output devices, e.g., keyboards, mice, microphones, cameras, touch pad, touch screens, scanners, displays, and speakers. Peripheral devices 138 may also include memory and other devices. The foregoing is a non-exhaustive list of other components 136. A feature of other components 136, peripheral devices 138, and busses 140, 142 is that power supplied to the component, device, or bus is independently controllable, i.e., the component may be powered up or down independently from other parts and components of the system 100.

Figure 2:
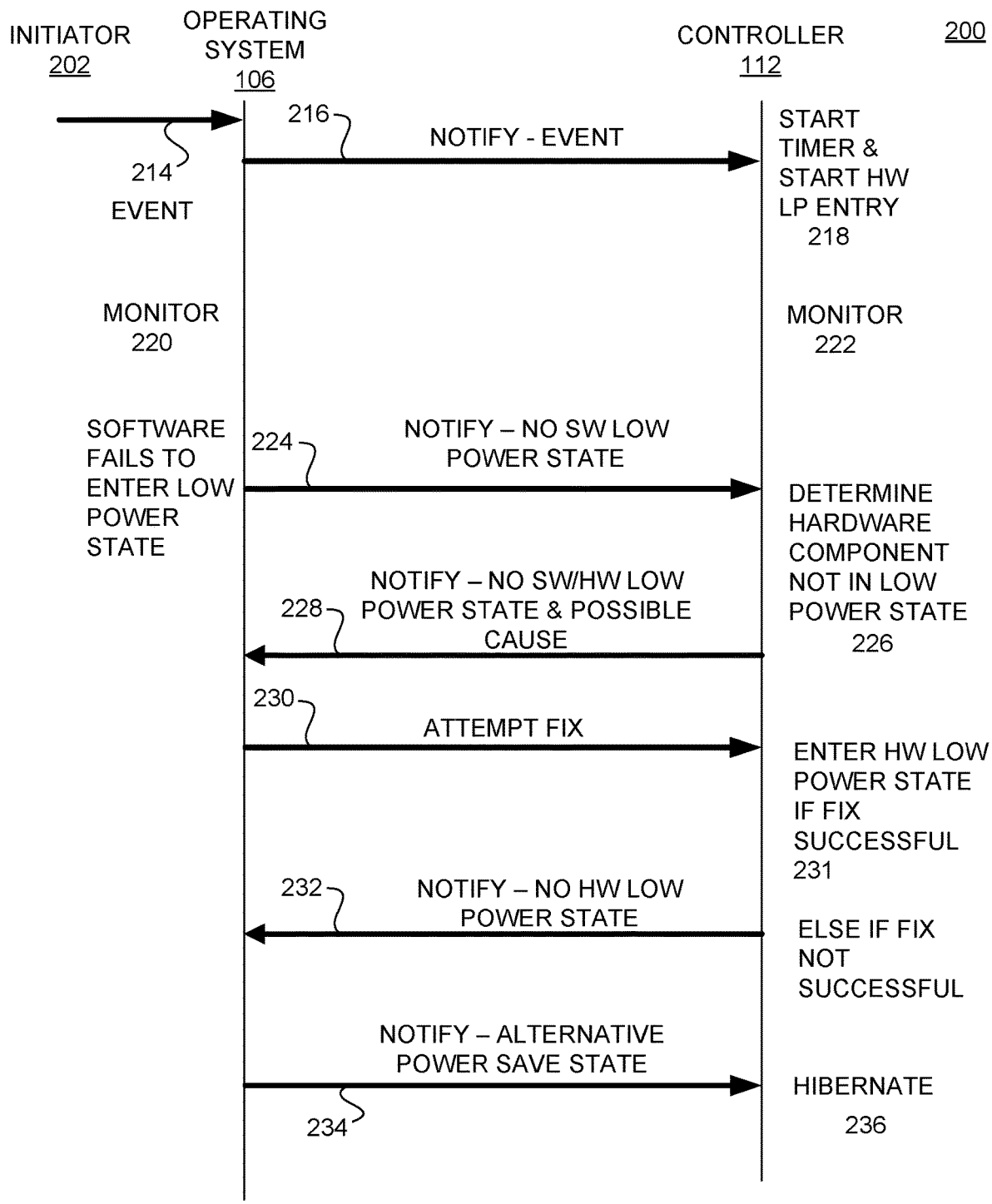
FIG. 2 illustrates a flow sequence diagram for a deterministic process for achieving a low power state according to various embodiments.

FIG. 2 illustrates a flow sequence diagram for a deterministic process 200 for achieving a low power state according to various embodiments. The sequence of actions of flow diagram 200 here can be modified. For example, some actions or processes can be performed in parallel and some actions can be performed out of order. Referring to FIG. 2, at 214, an initiator 202 causes an "event" to occur and OS 106 detects the event. The event indicates that a computer device may enter a first operating mode, e.g., Modern Standby. The initiator 202 may be a user, the OS 106 itself, or another device or component of the computer device. The event may be, for example, an absence of user activity, the user pressing a physical button on the device, the user closing the lid of a laptop, the user selecting "Sleep" from displayed power button settings, or the system idling out. At 216, OS 106 generates and sends a notification message to controller 112. The notification message indicates that OS 106 is entering the first operating mode, e.g., a Modern Standby entry message. In addition, the notification message includes an instruction for the hardware of the computer device to enter the first operating mode. At 218, controller 112 receives the first operating mode entry message. In response, controller 112 starts a first process for placing first hardware components in a low power state. Additionally, at 218, controller 112 starts a timer for a time-out period for performing the first process.

The first operating mode may specify particular hardware components and devices that are to be placed in the low power state, referred to herein as "first hardware components." In other words, the specification of components and devices included in first hardware components is configurable. A system designer may specify different components for different computer devices or to achieve different design goals. Accordingly, in various embodiments, components and devices included in first hardware components to be placed in low power mode may vary. However, in various embodiments, volatile memory 108 is not included in in first hardware components. In various embodiments, volatile memory 108 is not placed in a low power state in the first operating mode during the first process and OS 106 stores state information in volatile memory 108 in the first operating mode. In addition, controller 112 ensures that power is provided to volatile memory 108 in the first operating mode. The state information may be copied, for example, from cache 116, registers 118, or a memory. The state information may be one or operating system state information, application software state information, processor state information, or a combination of two or more of the foregoing types of state information. Display device 114 is typically placed in a low power state in the first operating mode. In some embodiments, non-volatile memory 110 may be included in first hardware components and placed in a low power state in the first operating mode.

At 220, SW power manager 122 of OS 106 monitors application software 124 and other components of OS 106 for their transition to SW DRIPS. At 222, controller 112 monitors first hardware components, e.g., the specified components of processor 102, and the specified components of other components 136 and peripheral components 138, for their transition to a low power state, e.g., HW DRIPS. SW power manager 122 and controller 112 monitor respective software and hardware components during a time-out period, e.g., a DRIPs time-out period. The time-out period is a predetermined period that is generally of sufficient length for the components to complete tasks in progress and enter low power mode, e.g., 1-30 seconds.

At 224, SW power manager 122 determines that one or more of application software or OS 106 failed to enter the low power state, e.g., SW DRIPS, within the time-out period. For example, SW power manager 122 may determine that application software 124 or OS 106 failed to enter the low power state because one or more hardware devices or components failed to acknowledge entry into its low power state. In addition, at 224, a message indicating that software failed to enter the low power state is sent from OS 106 to controller 112. In some embodiments, this message may also specify a reason that software failed to enter the low power state, e.g., acknowledgement not received from a particular hardware device or component.

At 226, controller 112 waits until the time-out period has expired. At the expiration of time-out period, controller 112 determines if either software or hardware did not enter the low power state, e.g., either SW or HW DRIPs was not achieved. If either or both software or hardware did not enter the low power state, controller 112 sends a message to OS 106 notifying it that software or hardware or both did not enter the low power state. In addition, at 228, in various embodiments, controller 112 determines a cause for the failure of the first process and communicates the determined cause to the OS 106. For example, in the case of hardware not entering the low power state, controller 112 determines that the cause for the failure of the first process is related to particular hardware devices or components. The controller 112 also initializes a counter for counting a number of fix attempts.

At 230, SW power manager 122 identifies one or more operations to fix the cause of the failure of the first process. An operation may be identified based on the determined cause for the failure of the first process, e.g., the particular device and status information obtained from the device. In various embodiments, the operation to fix the cause of the failure is performed by OS 106. In addition, OS 106 notifies controller 112 of the attempted fix and controller increments the counter. Example operations to fix the cause of failure include disabling a software stack or driver. For example, if an audio device did not transition to a low power state, the OS 106 may check to see if the audio stack is working correctly and forcibly disable the audio stack. As another example, the OS 106 may determine that a software driver is blocking a particular hardware device from entering a low power state and forcibly disable the driver. For example, a driver may not be installed or an incorrect driver is installed. After the operation to fix the cause of the failure of the first process is performed by OS 106, OS 106 may notify controller 112, and controller 112 determines whether the operation cured the problem identified as the cause of the failure. For example, if the cause of the failure is that a particular hardware component did not enter the low power state, it is determined if the component is in the low power state. If the operation did not cure the problem, a second attempt to cure the problem may be performed, i.e., the operation may be repeated or a different operation to cure the failure may be performed. After the second attempt, it is again determined if the component is in the low power state. If the second attempt was not successful, additional attempts may be made. If the cause of the failure is fixed, hardware enters the low power state at 231. Additional attempts may be made to cure the problem provided the number of additional attempts is less than a predetermined number, e.g., 1-5. Once a maximum number of attempts have been tried, attempts to fix the cause of the failure are halted. If the cause of the failure is not fixed, the process 200 advances to 232.

At 232, controller 112 sends a message to SW power manager 122 indicating that the permitted number of attempts to fix the problem have been made and all specified hardware is not in a low power state, e.g., HW DRIPS. In response to the message at 232, the SW power manager 122, at 234, sends a message to the controller 112 to start a second process to place the computer device in a second operating mode. Like the first operating mode, the second operating mode specifies particular hardware components and devices that are to be placed in the low power state, referred to herein as "second hardware components." The second hardware components are configurable by a system designer and may differ from the first components. According to various embodiments, a volatile memory of the computer device, e.g., volatile memory 108, is included in the second hardware components. In various embodiments, the second operating mode copies state information from cache 116, registers 118, and volatile memory 108 before these devices enter low-power mode, and stores the state information in non-volatile memory 110 before the non-volatile memory 110 is placed in a low power state, e.g., powering off non-volatile memory 110. In some embodiments, the second operation mode includes a hibernate state (S4). At 236, controller places hardware components in the second operating mode.

In order to enter a working operating mode from the second operating mode, it may be necessary to perform a boot process. In addition to enter a working operating mode, it is necessary to copy state information from non-volatile memory 110 to cache 116, registers 118, and volatile memory 108 in order to restore the state of the computer device. Accordingly, returning a computer device to working operating mode from the second operating mode may take longer than returning a computer device from the first operating mode. However, this additional latency is offset by the benefit of insuring that the computer device predictably enters a low power mode to achieve low power consumption, even when a particular component would otherwise prevent the computer device from achieving DRIPS.

Figure 3A:
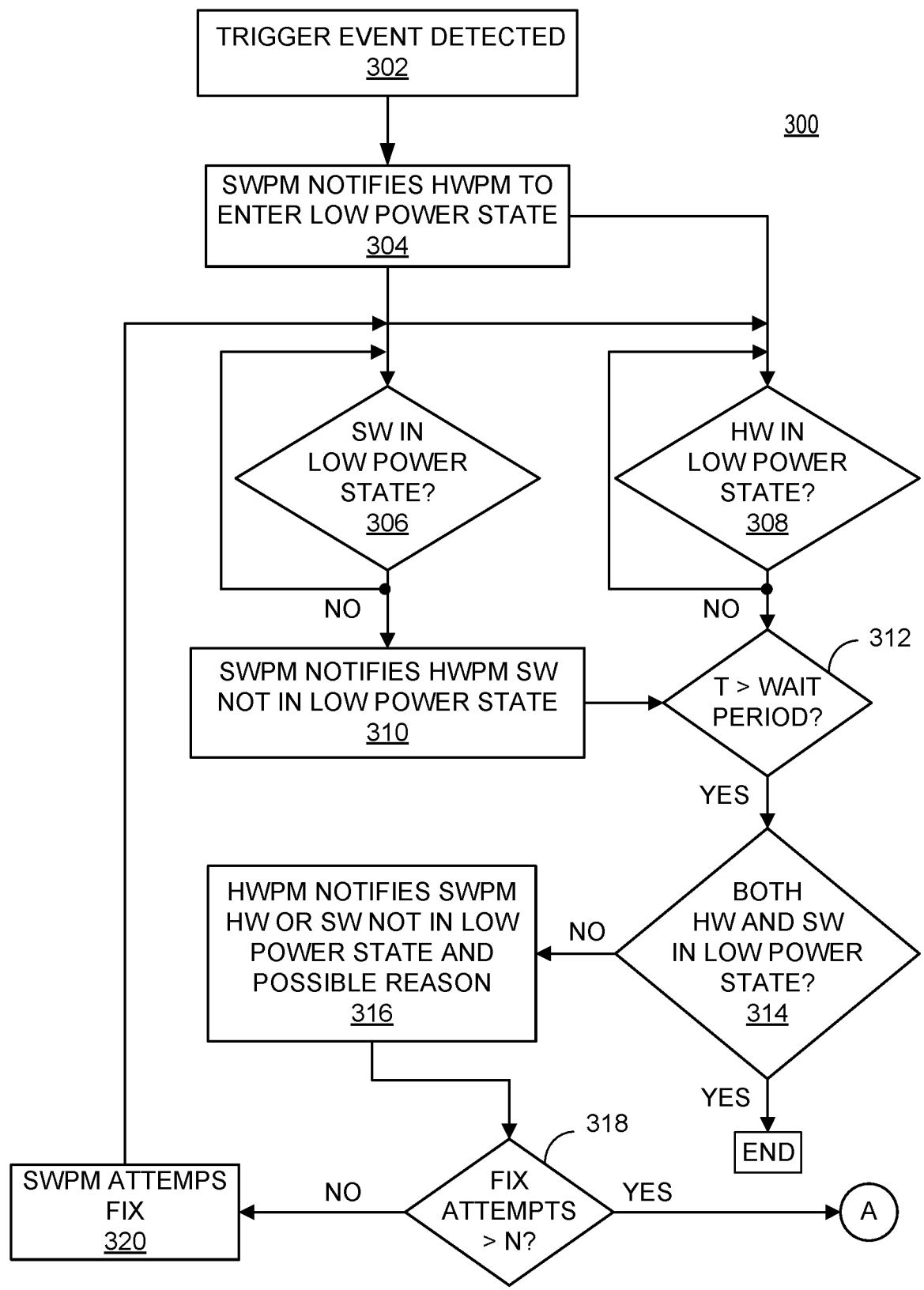
FIGS. 3A and 3B illustrate a flow diagram for a deterministic process for a computer device to achieve a low power state according to various embodiments.
Figure 3B:
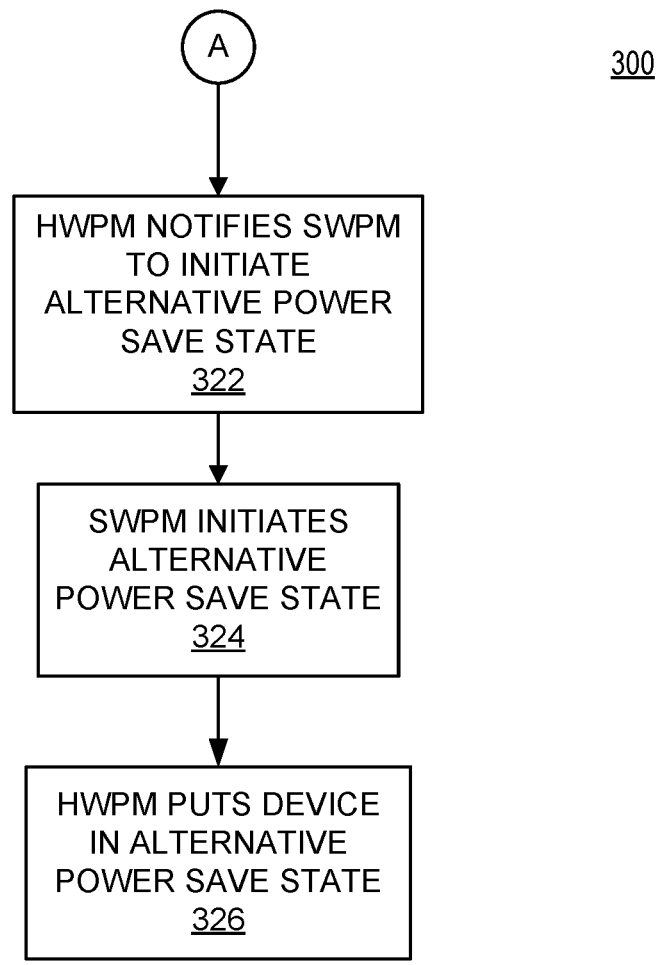

FIGS. 3A and B illustrate a flow diagram for a deterministic process 300 for a computer device to achieve a low power state according to various embodiments. The sequence of actions of flow diagram 300 here can be modified. For example, some actions or processes can be performed in parallel and some actions can be performed out of order. At 302, a trigger event is detected by software, e.g., OS 106. The trigger event indicates that the computer device may enter a first operating mode. The first operating mode may by a power saving mode, e.g., Modern Standby. At 304, a software power manager (SWPM) of OS 106 generates and sends a notification message to a hardware power manager (HWPM), e.g., controller 112, indicating that OS 106 is entering the first operating mode and instructing that hardware be placed in the first operating mode.

At 306, SWPM monitors the various software and operating system modules and components to determine whether they successfully transition to a low power state of the first operating mode, e.g., SW DRIPS. At 308, HWPM monitors first hardware components to determine whether they successfully transition to a low power state of the first operating mode, e.g., HW DRIPS. In addition, at 308, a timer of a time-out period, e.g., a DRIPs time-out period, is started.

If at 306 SWPM determined that one or more of application software or OS 106 failed to enter the low power state, SWPM notifies HWPM at 310 that software did not achieve the low power state of the first operating mode. At 312, HWPM determines whether the time-out period has expired. At 314, HWPM determines whether both software or hardware entered the low power state, e.g., SW and HW DRIPs was achieved. If both software or hardware entered the low power state, the first process ends. If either or both of software and hardware did not enter the low power state, at 316, HWPM sends a message to SWPM notifying it that software, hardware, or both did not enter the low power state. In addition, at 316, in various embodiments, HWPM determines a cause for the failure of the first process and communicates the determined cause to the SWPM. For example, in the case of hardware not entering the low power state, HWPM determines that the cause for the failure of the first process is related to a particular hardware device or component.

At 318, the SWPM identifies one or more operations to fix the cause of the failure of the first process. In some embodiments, the SWPM starts a counter for counting the number of attempts to fix the cause of the failure of the first process. At 320, SWPM identifies one or more operations to fix the cause of the failure of the first process and performs an operation to fix the cause of the failure. As one example, SWPM may disable an audio stack. As another example, SWPM may disable a driver. After the operation is performed, it is determined if the component is in the low power state. If the operation did not place the component in the low power state, then, at 320, additional attempts to cure the problem may be performed, e.g., the operation may be repeated or a different operation to cure the failure may be performed. The number of additional attempts to place the component in the low power state may be limited to a predetermined number ("N") of attempts. Once N attempts have been tried, no additional attempts to fix the cause of the failure are made. If the cause of the failure is fixed, the process 300 ends. If the cause of the failure is not fixed, the process 200 advances to 322.

At 322, HWPM sends a message to SWPM indicating that the N permitted number of attempts to fix the problem have been made and all specified hardware is not in a low power state, e.g., HW DRIPS. The message sent by HWPM at 322 notifies SWPM to place the computer device into an alternative low power state to prevent unnecessary power consumption, e.g., unnecessary battery drain. At 324, SWPM sends a message to the HWPM to start a second process to place the computer device in an alternative or second operating mode.

At 326, HPWM places the specified hardware components in the second operating mode. Like the first operating mode, the second operating mode specifies particular hardware components and devices that are to be placed in the low power state, referred to herein as "second hardware components." According to various embodiments, a volatile memory of the computer device, e.g., volatile memory 108, is included in the second hardware components. In various embodiments, the second operating mode copies state information from volatile memory devices to a non-volatile memory before the computer device is placed in the second operating mode. In some embodiments, the second operation mode includes a hibernate state (S4).

Elements of embodiments (e.g., flowchart with reference to FIGS. 3A and B) are also provided as a machine-readable medium (e.g., non-volatile memory 110) for storing the computer-executable instructions (e.g., instructions to implement any other processes discussed herein). In some embodiments, a computing platform comprises memory, a processor, machine-readable storage media (also referred to as tangible machine-readable medium), a communication interface (e.g., wireless or wired interface), and a network bus coupled together.

In some embodiments, the various logic blocks are coupled together via a Network Bus. Any suitable protocol may be used to implement the network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with the sequence diagram of FIG. 2 or the flow diagram of FIGS. 3A and B (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with the sequence flow diagrams of FIG. 2 and FIGS. 3A and B (and/or various embodiments) are executed by the system or one or more components thereof.

In some embodiments, the program software code/instructions associated with reference to FIG. 2 and FIGS. 3A and B (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

The software program code/instructions (associated with reference to FIG. 2 and FIGS. 3A and B and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), ferroelectric memory, resistive RAM, phase change memory (PCM), magnetic RAM (MRAM, among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

In some embodiments, the machine-readable storage media includes machine-readable instructions stored thereon, that when executed, cause one or more machines to perform a method comprising performing, in response to a first message from an operating system, a first process to place a computer device in a first operating mode, storing state information in a volatile memory of the computer device, and starting a timer for a time-out period for performing the first process, wherein first components of the computer device are in a low power state and the volatile memory is operational in the first operating mode; detecting, after expiration of the time-out period, a failure of the first process; and performing, in response to the detected failure of the first process, a second process to place the computer device in a second operating mode and storing state information in a non-volatile memory of the computer device, wherein the volatile memory is in a low power state in the second operating mode.

Figure 4:
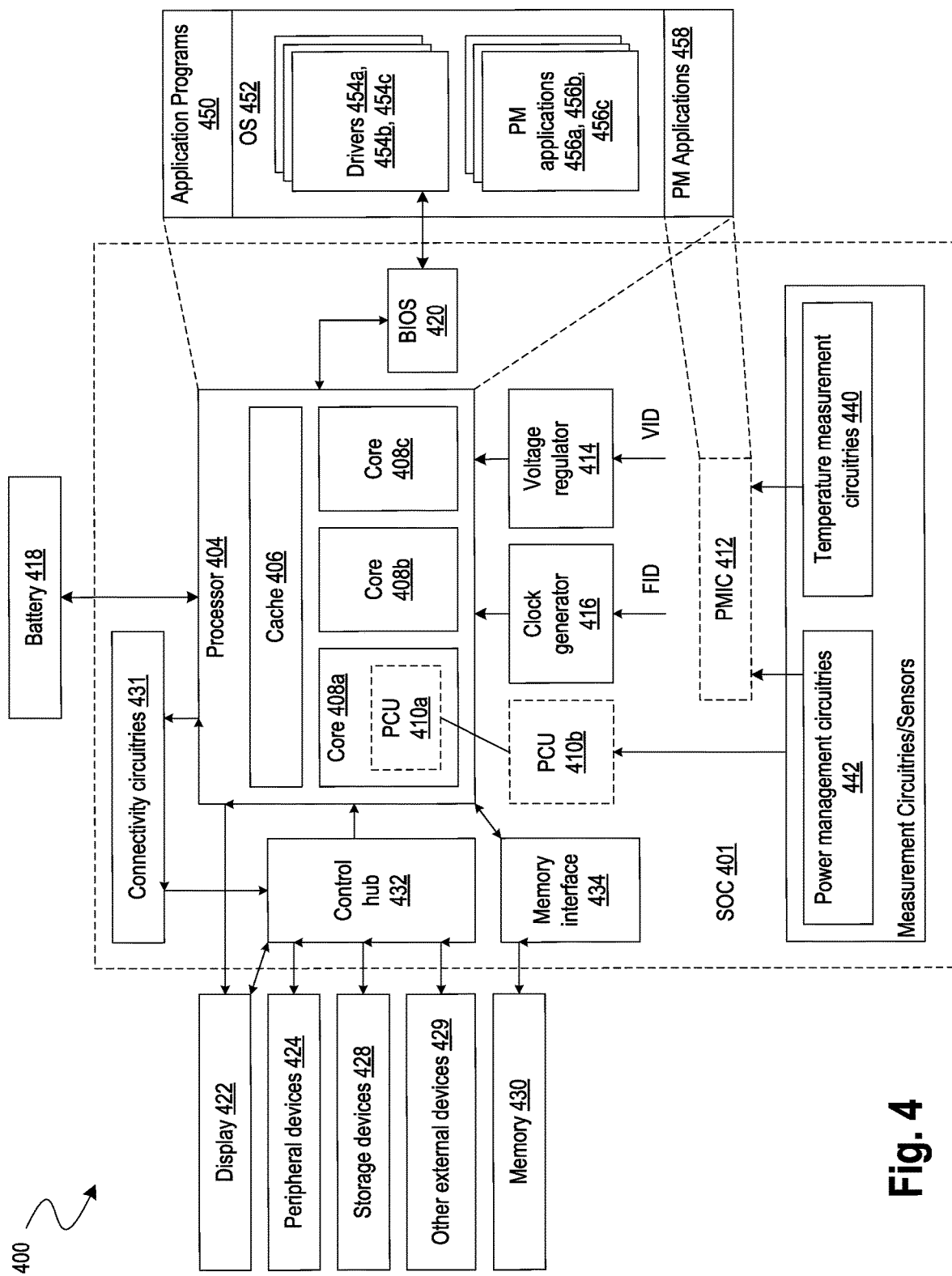
FIG. 4 illustrates a smart device or a computer system or an SoC (System-on-Chip) with a capability to achieve a low power state in a deterministic manner in accordance with some embodiments.

FIG. 4 illustrates a computer system or computing device 400 (also referred to as device 400), where the computer device has a capability to achieve a low power state in a deterministic manner, in accordance with some embodiments. It is pointed out that those elements of FIG. 4 having the same reference numbers (or names) as the elements of any other figure can operate or function in any manner similar to that described, but are not limited to such.

In some embodiments, device 400 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 400.

In an example, the device 400 comprises a SoC (System-on-Chip) 401. An example boundary of the SOC 401 is illustrated using dotted lines in FIG. 4, with some example components being illustrated to be included within SOC 401—however, SOC 401 may include any appropriate components of device 400.

In some embodiments, device 400 includes processor 404. Processor 404 can include one or more physical devices, such as microprocessors, application processors, microcontrollers, programmable logic devices, processing cores, or other processing means. The processing operations performed by processor 404 include the execution of an operating platform or operating system on which applications and/or device functions are executed. The processing operations include operations related to I/O (input/output) with a human user or with other devices, operations related to power management, operations related to connecting computing device 400 to another device, and/or the like. The processing operations may also include operations related to audio I/O and/or display I/O.

In some embodiments, processor 404 includes multiple processing cores (also referred to as cores) 408a, 408b, 408c. Although merely three cores 408a, 408b, 408c are illustrated in FIG. 4, the processor 404 may include any other appropriate number of processing cores, e.g., tens, or even hundreds of processing cores. Processor cores 408a, 408b, 408c may be implemented on a single integrated circuit (IC) chip. Moreover, the chip may include one or more shared and/or private caches, buses or interconnections, graphics and/or memory controllers, or other components.

In some embodiments, processor 404 includes cache 406. In an example, sections of cache 406 may be dedicated to individual cores 408 (e.g., a first section of cache 406 dedicated to core 408a, a second section of cache 406 dedicated to core 408b, and so on). In an example, one or more sections of cache 406 may be shared among two or more of cores 408. Cache 406 may be split in different levels, e.g., level 1 (L1) cache, level 2 (L2) cache, level 3 (L3) cache, etc.

In some embodiments, a given processor core (e.g., core 408a) may include a fetch unit to fetch instructions (including instructions with conditional branches) for execution by the core 408a. The instructions may be fetched from any storage devices such as the memory 430. Processor core 408a may also include a decode unit to decode the fetched instruction. For example, the decode unit may decode the fetched instruction into a plurality of micro-operations. Processor core 408a may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 408a (for example) may be an out-of-order processor core in one embodiment. Processor core 408a may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 408a may also include a bus unit to enable communication between components of the processor core 408a and other components via one or more buses. Processor core 408a may also include one or more registers to store data accessed by various components of the core 408a (such as values related to assigned app priorities and/or sub-system states (modes) association.

In some embodiments, device 400 comprises connectivity circuitries 431. For example, connectivity circuitries 431 includes hardware devices (e.g., wireless and/or wired connectors and communication hardware) and/or software components (e.g., drivers, protocol stacks), e.g., to enable device 400 to communicate with external devices. Device 400 may be separate from the external devices, such as other computing devices, wireless access points or base stations, etc.

In an example, connectivity circuitries 431 may include multiple different types of connectivity. To generalize, the connectivity circuitries 431 may include cellular connectivity circuitries, wireless connectivity circuitries, etc. Cellular connectivity circuitries of connectivity circuitries 431 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 431 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 431 may include a network interface, such as a wired or wireless interface, e.g., so that a system embodiment may be incorporated into a wireless device, for example, cell phone or personal digital assistant.

In some embodiments, device 400 comprises control hub 432, which represents hardware devices and/or software components related to interaction with one or more I/O devices. For example, processor 404 may communicate with one or more of display 422, one or more peripheral devices 424, storage devices 428, one or more other external devices 429, etc., via control hub 432. Control hub 432 may be a chipset, a Platform Control Hub (PCH), and/or the like.

For example, control hub 432 illustrates one or more connection points for additional devices that connect to device 400, e.g., through which a user might interact with the system. For example, devices (e.g., devices 429) that can be attached to device 400 include microphone devices, speaker or stereo systems, audio devices, video systems or other display devices, keyboard or keypad devices, or other I/O devices for use with specific applications such as card readers or other devices.

As mentioned above, control hub 432 can interact with audio devices, display 422, etc. For example, input through a microphone or other audio device can provide input or commands for one or more applications or functions of device 400. Additionally, audio output can be provided instead of, or in addition to display output. In another example, if display 422 includes a touch screen, display 422 also acts as an input device, which can be at least partially managed by control hub 432. There can also be additional buttons or switches on computing device 400 to provide I/O functions managed by control hub 432. In one embodiment, control hub 432 manages devices such as accelerometers, cameras, light sensors or other environmental sensors, or other hardware that can be included in device 400. The input can be part of direct user interaction, as well as providing environmental input to the system to influence its operations (such as filtering for noise, adjusting displays for brightness detection, applying a flash for a camera, or other features).

In some embodiments, control hub 432 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 422 represents hardware (e.g., display devices) and software (e.g., drivers) components that provide a visual and/or tactile display for a user to interact with device 400. Display 422 may include a display interface, a display screen, and/or hardware device used to provide a display to a user. In some embodiments, display 422 includes a touch screen (or touch pad) device that provides both output and input to a user. In an example, display 422 may communicate directly with the processor 404. Display 422 can be one or more of an internal display device, as in a mobile electronic device or a laptop device or an external display device attached via a display interface (e.g., DisplayPort, etc.). In one embodiment display 422 can be a head mounted display (HMD) such as a stereoscopic display device for use in virtual reality (VR) applications or augmented reality (AR) applications.

In some embodiments and although not illustrated in the figure, in addition to (or instead of) processor 404, device 400 may include Graphics Processing Unit (GPU) comprising one or more graphics processing cores, which may control one or more aspects of displaying contents on display 422.

Control hub 432 (or platform controller hub) may include hardware interfaces and connectors, as well as software components (e.g., drivers, protocol stacks) to make peripheral connections, e.g., to peripheral devices 424.

It will be understood that device 400 could both be a peripheral device to other computing devices, as well as have peripheral devices connected to it. Device 400 may have a "docking" connector to connect to other computing devices for purposes such as managing (e.g., downloading and/or uploading, changing, synchronizing) content on device 400. Additionally, a docking connector can allow device 400 to connect to certain peripherals that allow computing device 400 to control content output, for example, to audiovisual or other systems.

In addition to a proprietary docking connector or other proprietary connection hardware, device 400 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 431 may be coupled to control hub 432, e.g., in addition to, or instead of, being coupled directly to the processor 404. In some embodiments, display 422 may be coupled to control hub 432, e.g., in addition to, or instead of, being coupled directly to processor 404.

In some embodiments, device 400 comprises memory 430 coupled to processor 404 via memory interface 434. Memory 430 includes memory devices for storing information in device 400. Memory can include nonvolatile (state does not change if power to the memory device is interrupted) and/or volatile (state is indeterminate if power to the memory device is interrupted) memory devices. Memory device 430 can be a dynamic random access memory (DRAM) device, a static random access memory (SRAM) device, flash memory device, phase-change memory device, or some other memory device having suitable performance to serve as process memory. In one embodiment, memory 430 can operate as system memory for device 400, to store data and instructions for use when the one or more processors 404 executes an application or process. Memory 430 can store application data, user data, music, photos, documents, or other data, as well as system data (whether long-term or temporary) related to the execution of the applications and functions of device 400.

Elements of various embodiments and examples are also provided as a machine-readable medium (e.g., memory 430) for storing the computer-executable instructions (e.g., instructions to implement any other processes discussed herein). The machine-readable medium (e.g., memory 430) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 400 comprises temperature measurement circuitries 440, e.g., for measuring temperature of various components of device 400. In an example, temperature measurement circuitries 440 may be embedded, or coupled or attached to various components, whose temperature are to be measured and monitored. For example, temperature measurement circuitries 440 may measure temperature of (or within) one or more of cores 408a, 408b, 408c, voltage regulator 414, memory 430, a mother-board of SOC 401, and/or any appropriate component of device 400.

In some embodiments, device 400 comprises power measurement circuitries 442, e.g., for measuring power consumed by one or more components of the device 400. In an example, in addition to, or instead of, measuring power, the power measurement circuitries 442 may measure voltage and/or current. In an example, the power measurement circuitries 442 may be embedded, or coupled or attached to various components, whose power, voltage, and/or current consumption are to be measured and monitored. For example, power measurement circuitries 442 may measure power, current and/or voltage supplied by one or more voltage regulators 414, power supplied to SOC 401, power supplied to device 400, power consumed by processor 404 (or any other component) of device 400, etc.

In some embodiments, device 400 comprises one or more voltage regulator circuitries, generally referred to as voltage regulator (VR) 414. VR 414 generates signals at appropriate voltage levels, which may be supplied to operate any appropriate components of the device 400. Merely as an example, VR 414 is illustrated to be supplying signals to processor 404 of device 400. In some embodiments, VR 414 receives one or more Voltage Identification (VID) signals, and generates the voltage signal at an appropriate level, based on the VID signals. Various type of VRs may be utilized for the VR 414. For example, VR 414 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 410a/b and/or PMIC 412. In some embodiments, each core has a network of distributed LDOs to provide efficient control for power management. The LDOs can be digital, analog, or a combination of digital or analog LDOs.

In some embodiments, device 400 comprises one or more clock generator circuitries, generally referred to as clock generator 416. Clock generator 416 generates clock signals at appropriate frequency levels, which may be supplied to any appropriate components of device 400. Merely as an example, clock generator 416 is illustrated to be supplying clock signals to processor 404 of device 400. In some embodiments, clock generator 416 receives one or more Frequency Identification (FID) signals, and generates the clock signals at an appropriate frequency, based on the FID signals.

In some embodiments, device 400 comprises battery 418 supplying power to various components of device 400. Merely as an example, battery 418 is illustrated to be supplying power to processor 404. Although not illustrated in the figures, device 400 may comprise a charging circuitry, e.g., to recharge the battery, based on Alternating Current (AC) power supply received from an AC adapter.

In some embodiments, device 400 comprises Power Control Unit (PCU) 410 (also referred to as Power Management Unit (PMU), Power Controller, etc.). In an example, some sections of PCU 410 may be implemented by one or more processing cores 408, and these sections of PCU 410 are symbolically illustrated using a dotted box and labelled PCU 410a. In an example, some other sections of PCU 410 may be implemented outside the processing cores 408, and these sections of PCU 410 are symbolically illustrated using a dotted box and labelled as PCU 410b. PCU 410 may implement various power management operations for device 400. PCU 410 may include hardware interfaces, hardware circuitries, connectors, registers, etc., as well as software components (e.g., drivers, protocol stacks), to implement various power management operations for device 400.

In some embodiments, device 400 comprises Power Management Integrated Circuit (PMIC) 412, e.g., to implement various power management operations for device 400. In some embodiments, PMIC 412 is a Reconfigurable Power Management ICs (RPMICs) and/or an IMVP (Intel® Mobile Voltage Positioning). In an example, the PMIC is within an IC chip separate from processor 404. The PMIC 412 may implement various power management operations for device 400. PMIC 412 may include hardware interfaces, hardware circuitries, connectors, registers, etc., as well as software components (e.g., drivers, protocol stacks), to implement various power management operations for device 400.

In an example, device 400 comprises one or both PCU 410 or PMIC 412. In an example, any one of PCU 410 or PMIC 412 may be absent in device 400, and hence, these components are illustrated using dotted lines.

Various power management operations of device 400 may be performed by PCU 410, by PMIC 412, or by a combination of PCU 410 and PMIC 412. For example, PCU 410 and/or PMIC 412 may select a power state (e.g., P-state) for various components of device 400. For example, PCU 410 and/or PMIC 412 may select a power state (e.g., in accordance with the ACPI (Advanced Configuration and Power Interface) specification) for various components of device 400. Merely as an example, PCU 410 and/or PMIC 412 may cause various components of the device 400 to transition to a sleep state, to an active state, to an appropriate C state (e.g., C0 state, or another appropriate C state, in accordance with the ACPI specification), etc. In an example, PCU 410 and/or PMIC 412 may control a voltage output by VR 414 and/or a frequency of a clock signal output by the clock generator, e.g., by outputting the VID signal and/or the FID signal, respectively. In an example, PCU 410 and/or PMIC 412 may control battery power usage, charging of battery 418, and features related to power saving operation.

The clock generator 416 can comprise a phase locked loop (PLL), frequency locked loop (FLL), or any suitable clock source. In some embodiments, each core of processor 404 has its own clock source. As such, each core can operate at a frequency independent of the frequency of operation of the other core. In some embodiments, PCU 410 and/or PMIC 412 performs adaptive or dynamic frequency scaling or adjustment. For example, clock frequency of a processor core can be increased if the core is not operating at its maximum power consumption threshold or limit. In some embodiments, PCU 410 and/or PMIC 412 determines the operating condition of each core of a processor, and opportunistically adjusts frequency and/or power supply voltage of that core without the core clocking source (e.g., PLL of that core) losing lock when the PCU 410 and/or PMIC 412 determines that the core is operating below a target performance level. For example, if a core is drawing current from a power supply rail less than a total current allocated for that core or processor 404, then PCU 410 and/or PMIC 412 can temporarily increase the power draw for that core or processor 404 (e.g., by increasing clock frequency and/or power supply voltage level) so that the core or processor 404 can perform at a higher performance level. As such, voltage and/or frequency can be increased temporality for processor 404 without violating product reliability.

In an example, PCU 410 and/or PMIC 412 may perform power management operations, e.g., based at least in part on receiving measurements from power measurement circuitries 442, temperature measurement circuitries 440, charge level of battery 418, and/or any other appropriate information that may be used for power management. To that end, PMIC 412 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor (s) may be directly coupled to PCU 410 and/or PMIC 412 in at least one embodiment to allow PCU 410 and/or PMIC 412 to manage processor core energy at least in part based on value(s) detected by one or more of the sensors.

Also illustrated is an example software stack of device 400 (although not all elements of the software stack are illustrated). Merely as an example, processors 404 may execute application programs 450, Operating System 452, one or more Power Management (PM) specific application programs (e.g., generically referred to as PM applications 458), and/or the like. PM applications 458 may also be executed by the PCU 410 and/or PMIC 412. OS 452 may also include one or more PM applications 456a, 456b, 456c. The OS 452 may also include various drivers 454a, 454b, 454c, etc., some of which may be specific for power management purposes. In some embodiments, device 400 may further comprise a Basic Input/Output System (BIOS) 420. BIOS 420 may communicate with OS 452 (e.g., via one or more drivers 454), communicate with processors 404, etc.

For example, one or more of PM applications 458, 456, drivers 454, BIOS 420, etc. may be used to implement power management specific tasks, e.g., to control voltage and/or frequency of various components of device 400, to control wake-up state, sleep state, and/or any other appropriate power state of various components of device 400, control battery power usage, charging of the battery 418, features related to power saving operation, etc.

According to various embodiments, operating system 452 includes instructions for detecting an event indicating that computing device 400 may enter a first operating mode, e.g., Modern Standby. The instructions provide that, in response to detecting the event, operating system 452 generates and sends a notification message to a hardware device or component that controls operating modes for the computing device 400, e.g., PCU 410a, PCU 410b, or PMIC 412. The notification message includes an instruction to the power managing device to perform a first process that places hardware power states specified by a first operating mode, e.g., Modern Standby. The instructions of operating system 452 also cause the software stack to transition through a set of phases to place application programs 450 and operating system 452 (including drivers 454 and PM applications 456) into a lowest power state, e.g., SW DRIPS.

The first operating mode specifies "first hardware components" that are to be placed in the low power state of the first operating mode. According to various embodiments, a volatile memory of the computing device 400 is excluded from the first hardware components. In various embodiments, the first operating mode copies state information from and stores the state information in the volatile memory before all of the first hardware components enter the low power state of the first operating mode.

The power managing device, e.g., PCU 410a, PCU 410b, or PMIC 412, is operable to instruct or cause various hardware components to enter a low power state associated with the first operating mode in response to receipt of the notification. However, sometimes software or hardware may not enter respective SW DRIPs or HW DRIPs as intended, which is wasteful of power and may cause battery 418 to be needlessly run down.

Operating system 452 includes instructions for monitoring the transition of application programs 450 and operating system 452 itself to SW DRIPS. For example, a PM application 456 may include instructions for monitoring the transition of application programs 450 and operating system 452. The power managing device, e.g., PCU 410a, PCU 410b, or PMIC 412, is operable to monitor the transition of specified hardware components to a low power state, e.g., HW DRIPS. (As described elsewhere, the first operating mode specifies particular hardware components are to enter a low power state.) The power managing device includes a timer of a time-out period for software (monitoring application programs 450 and operating system 452) and hardware (the specified hardware components) to transition to low power mode.

Operating system 452 includes instructions for determining that one or more of application software 450 or operating system 452 failed to enter the low power state, e.g., SW DRIPs, within the time-out period. In addition, Operating system 452 includes instructions to send a message to the power managing device indicating that software failed to enter the low power state. This message may also specify a reason that software failed to enter the low power state.

The power managing device, e.g., PCU 410a, PCU 410b, or PMIC 412, is operable to determine, at expiration of the time-out period, if either software or hardware did not enter the low power state. The power managing device is configured to send a message to operating system 452, the message indicating that software or hardware or both did not enter the low power state, and a cause for the failure of the first process.

Operating system 452 includes instructions for identifying one or more operations to fix the cause of the failure of the first process and for performing the operation to fix the cause of the failure. The instructions also provide for sending a message to the power managing device indicating performance of a fix operation. The power managing device may determine if the fix operation was a success and increment a count of fix operations. If the operation did not cure the problem, a second or further attempt to cure the problem may be performed, i.e., the operation may be repeated or a different operation to cure the failure may be performed. The power managing device increments the counter each time a fix operation is performed. The power managing device may determine if a maximum number of fix operations have been attempted. If the cause of the failure is not fixed after the maximum number of attempts, the power managing device sends a message to operating system 452 instructing it to place the computing device 400 in a second operating mode, e.g., hibernate (S4).

Operating system 452 includes instructions to respond to the message by sending a message to power managing device, e.g., PCU 410a, PCU 410b, or PMIC 412, to start a second process to place the computer device in the second operating mode. In addition, operating system instructions include instructions to place application programs 450 and operating system 452 in the second operating mode. The second operating mode specifies "second hardware components" that are to be placed in the low power state of the second operating mode. According to various embodiments, a volatile memory of the computing device 400 is included in the second hardware components. In various embodiments, the second operating mode copies state information from and stores the state information in non-volatile memory before entering the low power state of the second operating mode. In some embodiments, the second operation mode includes a hibernate state (S4).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g, immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect.

An interface may include logic and I/O driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a first circuitry to perform, in response to a first message from an operating system, a first process to place a computer device in a first operating mode, store state information in a volatile memory of the computer device, and start a timer for a time-out period for performing the first process, wherein first components of the computer device are in a low power state and the volatile memory is operational in the first operating mode; a second circuitry to detect, after expiration of the time-out period, a failure of the first process; and a third circuitry to perform, in response to the detected failure of the first process, a second process to place the computer device in a second operating mode and store state information in a non-volatile memory of the computer device, wherein the volatile memory is in a low power state in the second operating mode.

Example 2: The apparatus of example 1, wherein the first message includes instructions to place the computer device in the first operating mode and to start the timer for the time-out period for performing the first process.

Example 3: The apparatus of example 1, wherein the apparatus includes operating system instructions to send a second message to a power management unit, the message indicating that a software low power state has not been achieved.

Example 4: The apparatus of example 1, wherein the apparatus further comprises: fourth circuitry to determine a cause for the failure of the first process.

Example 5: The apparatus of example 4, wherein the apparatus further comprises: a power management unit to send a third message to the operating system, the third message indicating the failure of the first process.

Example 6: The apparatus of example 5, wherein the apparatus includes operating system instructions to identify one or more operations to fix the cause of the failure of the first process, the identifying of the one or more operations being based on the determined cause for the failure of the first process.

Example 7: The apparatus of example 1, wherein the apparatus further comprises: operating system instructions to perform an operation to fix the cause of the failure of the first process; and a fifth circuitry to count instances of the operating system performing the operation to fix the cause of the failure and to determine if the count exceeds a maximum number of attempts to fix the cause of the failure.

Example 8: The apparatus of example 7, wherein the apparatus further comprises a power management unit: to halt the first process in response to the count exceeding the maximum number of attempts to fix the cause of the failure; and to send a message to the operating system instructing the operating system to initiate the second process to place the computer device in the second operating mode.

Example 9: The apparatus of example 1, wherein the first operating mode includes an Advanced Configuration and Power Interface Modern Standby state.

Example 10: The apparatus of example 1, wherein the second operating mode includes an Advanced Configuration and Power Interface Hibernate state.

Example 11: The apparatus of example 1, wherein the state information includes at least one of operating system state information, application software state information, and processor state information.

Example 12: An apparatus comprising: a first circuitry to perform, in response to a first message from an operating system, a first process to place a computer device in a first operating mode, wherein first components of the computer device are in a low power state and a volatile memory is operational in the first operating mode; a second circuitry to receive a second message from the operating system, the second message indicating that a software low power state has not been achieved and to detect, after expiration of the time-out period, a failure of the first process; and a third circuitry to perform, in response to the detected failure of the first process, a second process to place the computer device in a second operating mode and store state information in a non-volatile memory of the computer device, wherein the volatile memory is in a low power state in the second operating mode.

Example 13: The apparatus of example 12, wherein the first operating mode includes an Advanced Configuration and Power Interface Modern Standby state, and the second operating mode includes an Advanced Configuration and Power Interface Hibernate state.

Example 14: A system comprising: a processor and a memory to execute an operating system; a display device coupled to the processor, the display device to display an image based on a signal communicated to the display device; and coupled to the processor and the memory, a power management unit to: perform a first process to place the system in a first operating mode, store state information in a volatile memory, wherein first components of the system are in a low power state and the volatile memory is operational in the first operating mode; detect a failure of the first process; and perform, in response to the detected failure of the first process, a second process to place the computer device in a second operating mode and store state information in a non-volatile memory of the computer device, wherein second components of the computer device are in a low power state in the second operating mode.

Example 15: The system of example 14, wherein the system further comprises operating system instructions to send a message to a power management unit, the message indicating that a software low power state has not been achieved.

Example 16: The system of example 14, wherein the system further comprises operating system instructions to identify one or more operations to fix the cause of the failure of the first process.

Example 17: The system of example 16, wherein the one or more operations to fix the cause of the failure of the first process includes disabling a software stack or software driver.

Example 18: The system of example 16, wherein the system further comprises: operating system instructions to perform an operation to fix the cause of the failure of the first process; and the power management unit to count instances of the operating system performing the operation to fix the cause of the failure and to determine if the count exceeds a maximum number of attempts to fix the cause of the failure.

Example 18: The system of example 14, wherein the first operating mode includes an Advanced Configuration and Power Interface S0ix state.

Example 20: The system of example 14, wherein the second operating mode includes an Advanced Configuration and Power Interface S4 state.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first circuitry to perform, in response to a first message from an operating system, a first process to place a computer device in a first operating mode, store state information in a volatile memory of the computer device, and start a timer for a time-out period for performing the first process, wherein the first process comprises placing first components of the computer device in a low power state, the first components excluding the volatile memory, and the volatile memory is operational in the first operating mode;
   a second circuitry to detect, after expiration of the time-out period, a failure of the first process by detecting a failure of one of the first components to enter the low power state; and
   a third circuitry to perform, in response to the detected failure of the first process, a second process to place the computer device in a second operating mode and store state information in a non-volatile memory of the computer device, wherein the second process comprises placing second components of the computer device in a low power state, and the volatile memory is in a low power state in the second operating mode.

2. The apparatus of claim 1, wherein the first message includes instructions to place the computer device in the first operating mode and to start the timer for the time-out period for performing the first process.

3. The apparatus of claim 1, wherein the apparatus includes operating system instructions to send a second message to a power management unit, the second message indicating that a software low power state has not been achieved.

4. The apparatus of claim 1, wherein the apparatus further comprises:
   fourth circuitry to determine a cause for the failure of the first process.

5. The apparatus of claim 4, wherein the apparatus further comprises:
   a power management unit to send a third message to the operating system, the third message indicating the failure of the first process.

6. The apparatus of claim 5, wherein the apparatus includes operating system instructions to identify one or more operations to fix the cause of the failure of the first process, the identifying of the one or more operations being based on the determined cause for the failure of the first process.

7. The apparatus of claim 1, wherein the apparatus further comprises:
   operating system instructions to perform an operation to fix a cause of the failure of the first process; and
   a fifth circuitry to count instances of the operating system performing the operation to fix the cause of the failure and to determine if the count exceeds a maximum number of attempts to fix the cause of the failure.

8. The apparatus of claim 7, wherein the apparatus further comprises a power management unit:
   to halt the first process in response to the count exceeding the maximum number of attempts to fix the cause of the failure; and
   to send a message to the operating system instructing the operating system to initiate the second process to place the computer device in the second operating mode.

9. The apparatus of claim 1, wherein the first operating mode includes an Advanced Configuration and Power Interface Modern Standby state.

10. The apparatus of claim 1, wherein the second operating mode includes an Advanced Configuration and Power Interface Hibernate state.

11. The apparatus of claim 1, wherein the state information includes at least one of operating system state information, application software state information, and processor state information.

12. An apparatus comprising:
a first circuitry to perform, in response to a first message from an operating system, a first process to place a computer device in a first operating mode, wherein the first process comprises placing first components of the computer device in a low power state, the first components comprising a software component, and a volatile memory is operational in the first operating mode;
a second circuitry to receive a second message from the operating system, the second message indicating that the software component failed to enter the low power state and to detect, after expiration of a time-out period, a failure of the first process; and
a third circuitry to perform, in response to the detected failure of the first process, a second process to place the computer device in a second operating mode and store state information in a non-volatile memory of the computer device, wherein the volatile memory is in a low power state in the second operating mode.

13. The apparatus of claim 12, wherein the first operating mode includes an Advanced Configuration and Power Interface Modern Standby state, and the second operating mode includes an Advanced Configuration and Power Interface Hibernate state.

14. A system comprising:
a processor and a memory to execute an operating system;
a display device coupled to the processor, the display device to display an image based on a signal communicated to the display device; and
coupled to the processor and the memory, a power management unit to:
perform a first process to place the system in a first operating mode, store state information in a volatile memory, wherein the first process comprises placing first components of the system in a low power state, the first components excluding the volatile memory, and the volatile memory is operational in the first operating mode;
detect a failure of the first process by detecting a failure of one of the first components to enter the low power state; and
perform, in response to the detected failure of the first process, a second process to place the system in a second operating mode and store state information in a non-volatile memory of the system, wherein the second process comprises placing second components of the system in a low power state and the second components include the volatile memory.

15. The system of claim 14, wherein the system further comprises operating system instructions to send a message to the power management unit, the message indicating that a software low power state has not been achieved.

16. The system of claim 14, wherein the system further comprises operating system instructions to identify one or more operations to fix a cause of the failure of the first process.

17. The system of claim 16, wherein the one or more operations to fix the cause of the failure of the first process includes disabling a software stack or software driver.

18. The system of claim 16, wherein the system further comprises:
operating system instructions to perform an operation to fix the cause of the failure of the first process; and
the power management unit to count instances of the operating system performing the operation to fix the cause of the failure and to determine if the count exceeds a maximum number of attempts to fix the cause of the failure.

19. The system of claim 14, wherein the first operating mode includes an Advanced Configuration and Power Interface S0ix state.

20. The system of claim 14, wherein the second operating mode includes an Advanced Configuration and Power Interface S4 state.

* * * * *